July 3, 1962
H. R. SHILLINGTON
3,042,859
CAPACITANCE MEASURING CIRCUIT
Filed March 13, 1957
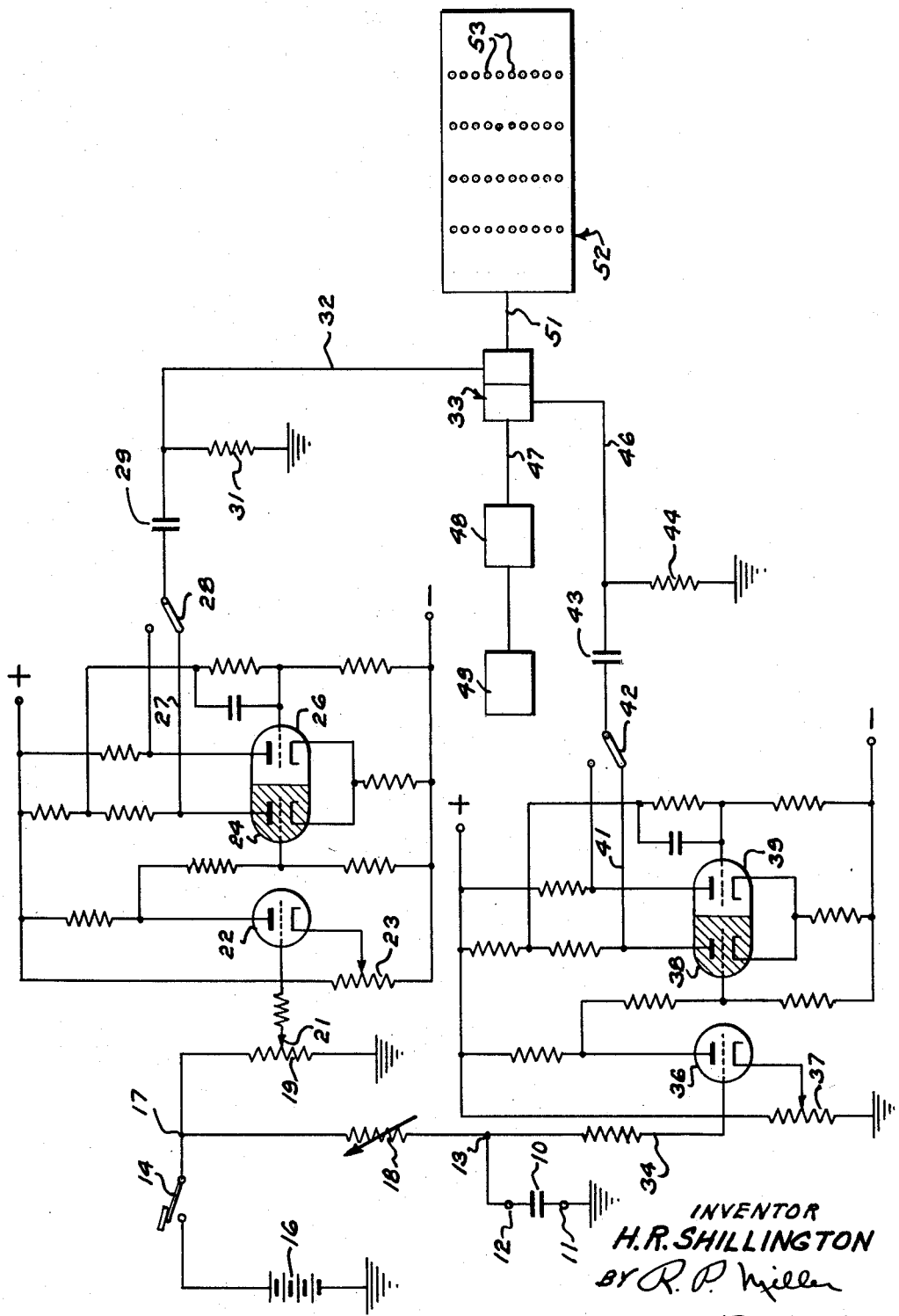
INVENTOR
H. R. SHILLINGTON
BY R. P. Miller
ATTORNEY United States Patent Office 3,042,859
Patented July 3, 1962

1

3,042,859
CAPACITANCE MEASURING CIRCUIT
Harry R. Shillington, Glen Ellyn, Ill., assignor to Western Electric Company, Incorporated, New York, N.Y., a corporation of New York
Filed Mar. 13, 1957, Ser. No. 645,689
2 Claims. (Cl. 324—60)

This invention relates to capacitance measuring circuits, and more particularly to a capacitance measuring circuit employing a multi-stage counter operated through a number of stages as determined by the time required to apply a predetermined charge on a capacitor.

In measuring capacitance within finite limits, the usual procedure is to employ a complex and expensive bridge circuit having circuit parameters that may be adjusted to effectuate a balanced condition whereafter a reading may be obtained. Use of such bridge circuits are not readily adapted for mass production testing, since excessive time is required to balance the bridge. Further, unless trained technicians are employed to conduct these tests, there is an ever present danger of serious damage to the expensive bridge circuit.

It is a primary object of the present invention to provide a relatively inexpensive capacitance measuring circuit that functions to expeditiously measure capacitance values with a high degree of accuracy.

Another object of the invention resides in a capacitor test set wherein the time interval is measured for placing a predetermined charge on the capacitor.

A further object of the invention is the provision of a time measuring device that is initiated and stopped by two electronic pulse generating means, respectively operated by the application of a charging potential to a capacitor and by the acquisition of a predetermined charge on the capacitor.

With these and other objects in view, the present invention contemplates a timer comprising a multi-stage counter having indicating means associated with each stage. A charging circuit is provided to apply a charge to a capacitor under test, and simultaneously upon application of the charging potential, the counter is initiated into operation. When a predetermined charge is placed on the capacitor, an electronic pulse generating circuit is actuated to generate a pulse which functions to stop the counter.

The indicating means are marked in values indicative of capacitance. Inasmuch as capacitance is a function of the time required to place a predetermined charge on a capacitor, the operated indicating means, associated with the operated stages of the counter at the completion of the test, gives a reading representative of the capacitance value of the capacitor.

Other objects and advantages of the present invention will be apparent from the following detailed description when considered in conjunction with the accompanying drawing, wherein there is shown a circuit diagram of a test set for measuring capacitance in accordance with the principles of the present invention.

Referring to the drawing, there is shown a capacitor 10 that is either a standard capacitor for initially setting up the test circuit or a capacitor to be tested. The capacitor is connected between contacts 11 and 12 that are respectively connected to ground and to a junction point 13. A positive potential may be impressed on the junction point 13 by closing a switch 14 that connects the positive side of a battery 16 through the closed switch 14, through a junction point 17 and through an adjustable resistance 18 to the junction point 13, and hence to the upper plate of the capacitor 10. Junction point 17 is also connected through an adjustable potentiometer 19 to ground. An adjustable tapped contact 21 is connected to the grid of a trigger amplifier tube 22. Connected to the cathode of this tube is a potentiometer 23 that functions to establish cathode potential, and hence the grid potential required to place the tube in a conductive condition. The anode of tube 22 is connected to the grid of a triode 24. The triode 24 together with a triode 26 are interconnected to form a one-shot multivibrator. Circuit parameters are selected for the respective triodes so that triode 24 is normally maintained in a conductive condition. Connected to the anode of the triode 24 is a lead 27 running to a switch 28 connected to a differentiating circuit consisting of a capacitance 29 and a resistance 31. A lead 32 is connected to the differentiating circuit and terminates at a commercially available electronic gating circuit generally designated by the reference numeral 33.

Junction point 13 is connected by a lead 34 to the grid of a trigger amplifier tube 36 that has its cathode connected to a potentiometer 37. By adjustment of the potentiometer 37, it is possible to vary cathode potential and thus the grid potential required to place the tube 36 in a conductive condition. It will be noted that the grid potential is established by the potential of the positive charge accumulated on the capacitor 10. The anode of this tube is connected to the grid of a triode 38. Triode 38 together with a triode 39 are interconnected to form a one-shot multivibrator. Circuit parameters are selected for the multivibrator so that the left-hand triode 38 is normally maintained in a conductive state. The anode of triode 38 is connected by a lead 41 to a switch 42 that is in turn connected to a differentiating circuit consisting of a capacitor 43 and a resistance 44. The differentiating circuit is connected over a lead 46 to another section of the gating circuit 33.

Gating circuit 33 is connected over a lead 47 to a pulse shaper 48 adapted to receive and shape pulses emanating from a constantly running oscillator 49. If the gating circuit 33 is actuated by the reception of a pulse over the lead 32, the shaped pulses will be impressed over a lead 51 to drive a timer or a four decade electronic counter circuit generally designated by the reference numeral 52. This counter circuit may be of any of a great number of commercially available counters, and consists of a great number of coupled stages that are successively operated by the reception of a train of pulses over the lead 51. Associated with each stage of the counter is an indicating light 53. The gating circuit 33 is such that the receipt of a pulse over the lead 46 acts to shut off the gate and preclude further application of the pulses to the counter 52. It may be appreciated that upon application of an initiating pulse over the lead 32, pulses will be applied to the counter 52 to cause said counter to successively step through each stage. Upon receipt of a pulse over the lead 46, the gating circuit 33 is actuated to preclude further pulses from reaching the counter 52; consequently, the counter will stop and one lamp 53 in each decade will remain in an operated condition to indicate the total time that the counter is operated, which time is indicative of the time required to build up a charge on the capacitor 10 of sufficient magnitude to operate the tube 36.

In considering the operation of the present circuit as a means for determining the capacitance value of unknown capacitors, it should be first appreciated that when a current from a constant voltage source, such as source 16, is applied to a circuit consisting of a resistance R (18), in series with a capacitor (10) having a capacitance C, the charge on the capacitor at any instant may be determined from the equation:

$$q = EC\left(1 - \epsilon\frac{-t}{cr}\right)$$

where E is the potential of the constant voltage source and $\epsilon$ is the base of natural logarithms.

The relationship set forth in the equation makes it possible to use the aforedescribed circuit to determine whether a number of capacitors to be tested have the same capacitance values or capacitance values within prescribed limits. More particularly, if a standard capacitor having known predetermined capacitor value is inserted in the circuit, the capacitor will assume a certain charge after a precise increment of time. Now if a capacitor having an unknown capacitance value is inserted in the same circuit and the capacitor does have the same capacitance, then an identical time increment will be required to accumulate the same charge thereon. If the unknown capacitor has a different capacitance value, then obviously a different time increment will be required to accumulate the same charge. The circuit shown in the drawing utilizes these principles to enable an attendant to check large numbers of capacitors in a relatively short time to determine whether the unknown capacitors have the same capacitance value as that of a standard capacitor.

Utilizing the heretofore described circuit, a standard capacitor 10 having a known capacitance value is inserted in the circuit between contacts 11 or 12. The switch 14 is closed whereupon a charging potential is impressed across the capacitor and simultaneously therewith, an increased potential condition is impressed through junction point 17 and through the tapped contact 21 to the grid of the tube 22. This tube will be placed in a conductive condition whereupon its anode potential drops to impress a decreased potential condition on the grid of the normally conducting triode 24. This action will trip the one-shot multivibrator so that the triode 26 will become conductive and the triode 24 will be rendered non-conductive. Non-conduction of triode 24 is accompanied by a rise in anode potential that is impressed over lead 27, through switch 28 and through the differentiating circuit 29—31, whereupon a differentiated positive going pulse will be produced and impressed over the lead 32 to the gating circuit 33. Gating circuit 33 will then operate to permit pulses from the oscillator 49 to pass to the counter 52. Counter 52 will step along through successive stages to successively illuminate the associated lights 53.

Closure of switch 14 also impresses a charging potential on the capacitor 10, and as the charge accumulates thereon, it will reach a magnitude that is sufficient to overcome the grid bias on the tube 36 whereafter the tube assumes a conductive state. The anode potential of tube 36 thereupon drops to impress a decreased potential condition on the grid of the triode 38 thereby causing the one-shot multivibrator 38—39 to execute a cycle of operation. Non-conduction of triode 38 is accompanied by a rise in anode potential that is impressed over lead 41 through switch 42 to the differentiating circuit 43—44. A positive outgoing pulse will be thereupon impressed over lead 46 to the gating circuit 33. Receipt of this positive pulse causes the gating circuit to preclude further application of the drive pulses to the counter 52. The counter 52 thereupon stops and one light 53 in each decade is retained in an illuminated state.

By properly adjusting the potentiometer 37, it is possible to illuminate lights 53 in the four decades that are representative of a direct reading of the capacitance value of the standard capacitor. The circuit is now calibrated to give direct readings of unknown capacitance values of other capacitors.

When a capacitor to be tested is inserted between the contacts 11 and 12, and the switch 14 is closed, the counter 52 will step through a series of stages until sufficient charge is built up on the capacitor to cause the gating circuit 33 to preclude further application of stepping pulses over the lead 51. It is apparent that the illuminated lamps 53 will give a direct reading of the capacitance values. If a capacitor does not have a capacitance value within prescribed limits, then it will take either a longer or shorter period of time for a charge to build up to actuate the tube 36. As a result thereof, the counter 52 will either step through a lesser or greater number of stages to finally operate lights that are indicative of a capacitance value beyond the prescribed limits.

The gating circuit 33 used to illustrate the disclosed embodiment is operated by positive going pulses. However, a gating circuit that is operated in response to the receipt of negative pulses may also be used. In such instance, the switches 28 and 42 will be moved to the upper contact position whereupon operation of the respective multivibrators results in the generation of negative going trigger pulses.

It is to be understood that the above-described arrangements of circuit components and construction of elemental parts are simply illustrative of an application of the principles of the invention and any other modifications may be made without departing from the invention.

What is claimed is:

1. In a capacitance measuring test set, a multi-stage counter adapted to be operated by the application of pulses, an oscillator for generating pulses, a gating circuit interconnecting the oscillator and counter for blocking the passage of pulses, a first differentiating circuit connected to operate the gating circuit to pass pulses to the counter, a source of charging potential, means for applying said charging potential to a capacitor under test, means responsive to the application of the charging potential for applying the potential to the first differentiating circuit to produce a pulse to operate the gating circuit, a one-shot multivibrator, a second differentiating circuit connected to the one-shot multivibrator for producing and applying a pulse to the gating circuit to restore said gating circuit to the blocking condition, and means responsive to the accumulation of a predetermined charge on the capacitor for operating the one-shot multivibrator.

2. In a capacitance measuring test set, a multi-stage counter adapted to be operated by the application of pulses, an oscillator for generating pulses, a gating circuit interconnecting the oscillator and counter for blocking the passage of pulses, a first one-shot multivibrator, a first differentiating circuit connected through a dual position switch to the first one-shot multivibrator for producing and applying a pulse to the gating circuit to operate said gating circuit to pass pulses to the counter, whereby, when said dual position switch is placed in its first position, said differentiating circuit is connected to the normally conducting half of said first one-shot multivibrator and a pulse of one polarity is produced and, when said dual position switch is placed in its second position, said first differentiating circuit is connected to the normally non-conducting half of said first one-shot multivibrator and a pulse of a different polarity is produced, a source of charging potential, means for applying said charging potential to a capacitor under test, means responsive to the application of said charging potential to said capacitor for operating said first one-shot multivibrator, a second one-shot multivibrator, a second differentiating circuit connected through a dual position switch to the second one-shot multivibrator for producing and applying a pulse to the gating circuit to restore said gating circuit to the blocking condition, whereby, when said dual position switch is placed in its first position, said second differentiating circuit is connected to the normally conducting half of said second one-shot multivibrator and a pulse of one polarity is produced and, when said dual position switch is placed in its second position, said second differentiating circuit is connected to the normally non-conducting half of said second one-shot multivibrator and a pulse of a different polarity is produced, and means responsive to the accumulation of a predetermined charge on said capacitor for operating said second one-shot multivibrator.

References Cited in the file of this patent

UNITED STATES PATENTS

| | | |
|---|---|---|
| 2,177,569 | Jorgensen et al. | Oct. 24, 1939 |
| 2,436,872 | Smith | Mar. 2, 1948 |
| 2,455,543 | Williams | Dec. 7, 1948 |
| 2,504,848 | Kunz | Apr. 18, 1950 |
| 2,544,685 | Jackson | Mar. 13, 1951 |
| 2,596,396 | Foust | May 13, 1952 |
| 2,601,491 | Baker | June 24, 1952 |
| 2,743,418 | Nichols | Apr. 24, 1956 |
| 2,806,205 | Donath | Sept. 10, 1957 |